United States Patent [19]

Sakurazawa

[11] 4,266,696
[45] May 12, 1981

[54] CONVEYOR DEVICE FOR SUPPLYING BULK FOODS IN A MEASURED MANNER

[76] Inventor: Hatsuo Sakurazawa, 15-banchi, Shinozuka, Fujioka-shi, Gunma-ken, Japan

[21] Appl. No.: 872,472

[22] Filed: Jan. 26, 1978

[30] Foreign Application Priority Data

Aug. 8, 1977 [JP] Japan ................................ 52-94879

[51] Int. Cl.³ .............................................. B65G 47/40
[52] U.S. Cl. .................................... 222/197; 222/371; 198/706
[58] Field of Search ................. 222/371, 197; 198/701, 198/706, 711, 703

[56] References Cited

U.S. PATENT DOCUMENTS

| | | | |
|---|---|---|---|
| 190,845 | 5/1877 | Gamble et al. | 198/706 X |
| 270,048 | 1/1883 | Foster et al. | 222/371 X |
| 988,063 | 3/1911 | Ayers | 222/371 X |
| 2,547,476 | 4/1951 | Lehmann | 222/371 X |
| 4,184,584 | 1/1980 | Dehlen | 198/706 |

FOREIGN PATENT DOCUMENTS 1230374 12/1966 Fed. Rep. of Germany ........... 198/706

Primary Examiner—Robert J. Spar
Assistant Examiner—Frederick R. Handren
Attorney, Agent, or Firm—Irving M. Weiner; Pamela S. Burt; John L. Shortley

[57] ABSTRACT

A guide cylinder with its axis directed in the upper and lower directions is provided on the bottom of a hopper. In the guide cylinder are allowed to pass a plurality of measuring containers supported by an endless conveyor which is moving upwardly from the bottom of the hopper, so that bulk foods in the hopper are scooped up into the measuring containers. While the measuring container is still over the hopper, excess bulk foods are caused to fall onto the hopper by way of a suitable shaking operation. Thereafter, the bulk foods are conveyed out of the hopper by the conveyor, and exhausted at an exhausting station by turning the measuring container upside down. The distance between the measuring containers provided on the endless conveyor is made smaller than the length of the guide cylinder so that at least one of the measuring containers is always present in said guide cylinder. This enables the measuring containers to further serve as a bottom covering of the hopper.

4 Claims, 2 Drawing Figures 4,266,696

CONVEYOR DEVICE FOR SUPPLYING BULK FOODS IN A MEASURED MANNER

BACKGROUND OF THE INVENTION

FIELD OF THE INVENTION

The present invention is concerned with a conveyor device for supplying bulk foods in a measured manner, and is particularly concerned with a device which scoops articles from a hopper and supplies them to another unit in a measured manner.

Hoppers are frequently used to supply bulk foods such as corn flakes, granular materials and the like in a measured manner. Technicians, however, have had a troublesome problem in regard to the relation between the shape of a hopper and the hydrodynamic behavior of the materials.

That is, the hopper has a structure in which it is narrowed toward the lower part. While the materials are descending toward the lower part in the hopper, the lateral pressure exerted among the materials often causes them to maintain their balanced state, giving rise to the occurrence of a so-called bridge phenomenon in which the materials cease to descend. As a result, when the materials are being descended from the upper part of the hopper to the lower part thereof, the supply of the materials is substantially stopped or the materials are poorly supplied. Further, in regard to means for supplying the materials from the hopper to a measuring container by passing it beneath the hopper, it is necessary to provide an opening-closing means on the lower part of the hopper as well as to bring the timing into conformity between the opening-closing means and the conveyance of the measuring containers, rendering the construction quite complicated.

It has, therefore, been damanded to provide a supplying device of this kind which is free of the bridge phenomenon and which is simply constructed.

SUMMARY OF THE INVENTION

The present invention solves the aforementioned problems.

An object of the present invention, therefore, is to charge the materials into the measuring containers simply by passing an endless conveyor.

Another object of the present invention is to smoothly descend the materials onto the lower part of the hopper without requiring any particular mechanism while preventing the aforementioned so-called bridge phenomenon.

A further object of the present invention is to convey the materials in predetermined amounts repetitively and continuously in a measured manner by way of a simply constructed device.

In short, the conveyor device according to the present invention is so constructed that the endless conveyor passes upwardly from the bottom of the hopper, said endless conveyor rotatably and pivotally supporting a plurality of measuring containers which are usually held upwardly while maintaining a determined distance therebetween. Part of the loop of the endless conveyor is exposed to an exhaust station provided outside of the hopper where the bulk foods will be exhausted and where said measuring containers are turned by a suitable hooking device so that the bulk foods can be taken out, and another part of the loop is allowed to pass through the hopper as mentioned above.

On the bottom of the hopper is vertically installed a guide cylinder. A plurality of measuring containers mounted on said endless conveyor pass through the guide cylinder from a lower position toward higher positions to thereby scoop the bulk foods contained in said hopper.

Each of the measuring containers has a predetermined volume, and the amounts of the bulk foods accommodated in the measuring containers are roughly the same. Here, in order to convey the bulk foods in more precise amounts out of the hopper, the excess amounts of the bulk foods may be caused to fall by an appropriate shaking device while the measuring container is still inside the outer edge of the hopper.

The individual measuring containers are so mounted on the endless conveyor that the distance therebetween is smaller than the length of the guide cylinder. At least one of the measuring containers is always present in the guide cylinder whereby the bottom of the hopper maintains a substantially closed state.

According to the present invention as will be obvious from the foregoing description, the materials can be automatically contained in the measuring containers simply by driving the endless conveyor, owing to the abovementioned construction, obviating the need for providing a shutter that must be operated in synchronism with the movement of the containers at the lower part of the hopper, and further providing very easy operation. Furthermore, since the endless belt and the measuring containers pass through the materials in the hopper, the balance of pressure among the materials created by the laterally oriented force among the materials in the hopper is broken, contributing to prevent the so-called bridge phenomenon. Therefore, the materials in the hopper are permitted to smoothly descend toward the bottom, and the materials are accommodated in the measuring containers reliably. Moreover, according to the present invention, the materials can be measured and conveyed repetitively, continuously and reliably even with its generally simplified construction.

DETAILED DESCRIPTION OF PREFERRED EMBODIMENTS

Figure 1:
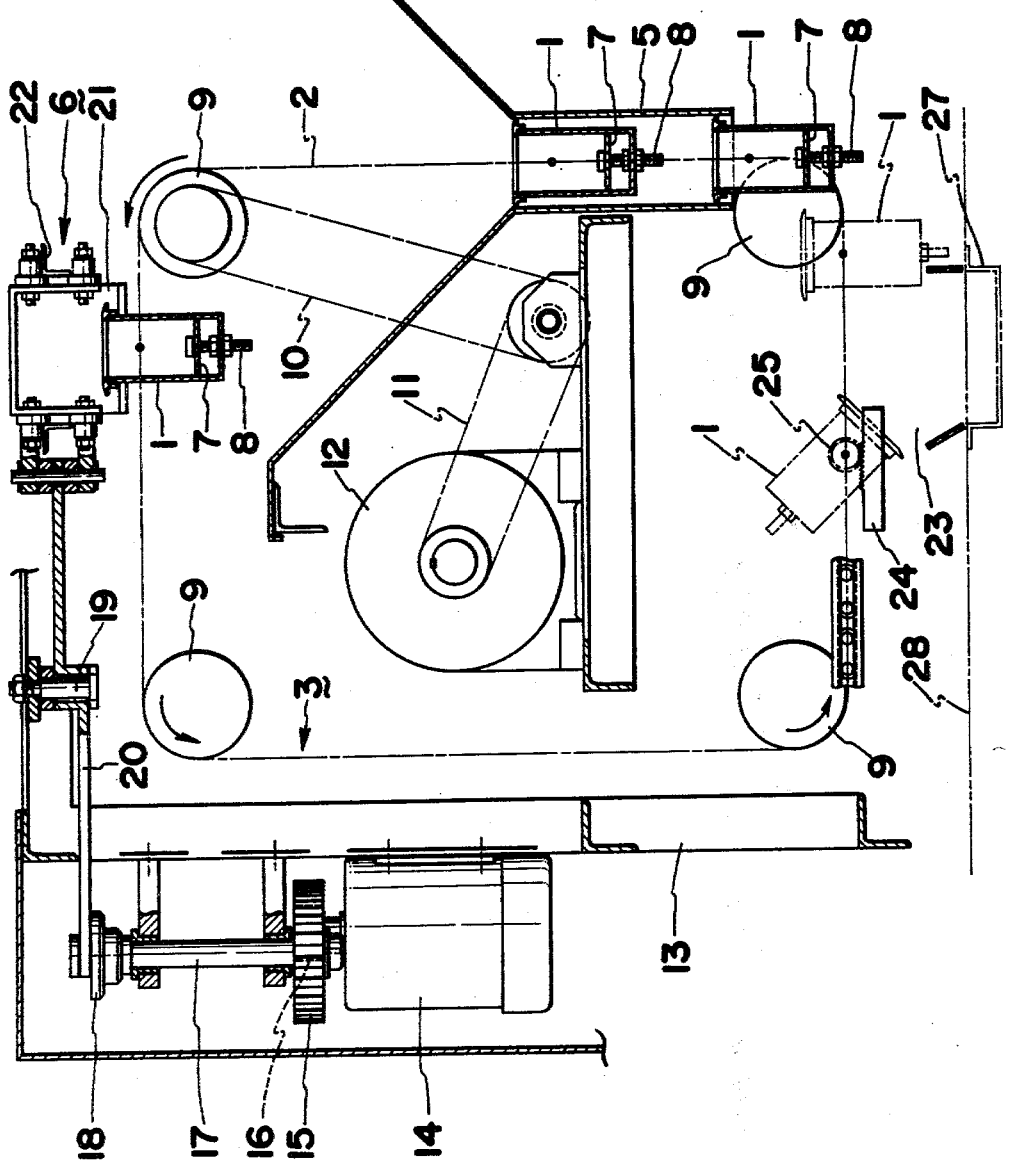
FIG. 1 is a partially cut-away front view of an embodiment of the present invention.

The invention is first illustrated with reference to FIG. 1, in which a plurality of measuring containers 1 are pivoted on an endless strip 2, maintaining equal distance, thereby to constitute an endless conveyor 3. The measuring containers 1 have a double layered bottom; a middle bottom 7 is permitted to be ascended or descended by way of a threaded rod 8 to adjust the volume. On the outer periphery of a port of the measuring containers 1 is also mounted a soft flexible flange made of a synthetic resin.

The measuring containers 1 are rotatably pivoted onto the endless strip 2 in a normally upwardly directed attitude. To normally keep the upwardly directed attitude, the measuring containers 1 have a center of gravity which is located at a lower position than the pivot part. A preferred example of the endless strip 2 may be a chain; a belt or the like may, of course, be employed.

Although not specifically shown, the endless strip 2 will consist of two parallel strips, and a plurality of measuring containers 1 are pivoted and equally spaced apart by means of a pivot shaft spanning across the endless strips 2.

The thus formed endless conveyor 3 runs around sprockets 9, and is driven by a motor 12 via chains 10, 11.

The endless conveyor 3 is so operated as to move upwardly in a hopper 4 in which are contained bulk foods (hereinafter simply called materials). From the bottom of the hopper 4 is downwardly extended a guide cylinder 5. The endless conveyor 3 is charged with the material as it passes through the guide cylinder 5. The inner diameter of the guide cylinder 5 has a size to fit to the outer diameter of the measuring conttainer 1, i.e., the outer surface of the measuring container 1 comes into sliding contact with the inner surface of the guide cylinder 5. In this embodiment, the flange comes into contact with the inner surface of the cylinder 5. The guide cylinder 5 has a length greater than the distance between the flange of one measuring container 1 and the flange of the succeeding measuring container 1, so that at least one measuring container 1 is always in contact with the inner surface of the guide cylinder 5.

An oscillating device 6 is installed above the hopper 4 on the track of the endless conveyor 3, to shake or oscillate the measuring container 1 so that excess materials will fall from the measuring container 1. A rotary shaft 17 is rotated by a motor 14 mounted on a housing 13 via gears 15, 16, a link 20 having a fulcrum 19 is oscillated by an eccentric member 18 at the end of said rotary shaft 17, and an engaging member 21 at the tip of said link 20 is engaged with the measuring container 1, whereby the oscillating device 6 causes the measuring container 1 to oscillate in the right and left directions in regard to its running direction (in a direction vertical to the paper in the drawing). Reference numeral 22 represents a rail for guiding the engaging member 21.

In an exhaust station 23 for exhausting the materials on the track of the endless conveyor 3 is provided a rack 24 which constitutes a hooking device for turning the measuring container 1. The rack 24 meshes with a pinion 25 that serves as a hooking device which is fastened to the measuring container 1 itself or to a pivot shaft thereof. Reference numeral 27 designates a container for containing the materials, which will be operated in synchronism with the endless conveyor 3 by way of a conveyor 28.

According to the device of the present invention, if the endless conveyor 3 is driven as indicated by arrows, the measuring containers 1 are caused to ascend, keeping sliding contact with the guide cylinder 5 and then to ascend from the bottom of the hopper 4 toward the upper direction, thereby scooping the materials. As the flange of the measuring container 1 separates away from the guide cylinder 5, the materials will flow down through the clearance between the guide cylinder 5 and the measuring container 1. However, since the succeeding measuring container 1 will have been introduced in the guide cylinder 5, the materials are accommodated in the succeeding measuring container 1 and do not leak downwardly. The strips 2 (belt or chain) extend between the containers 1 and the guide cylinder 5. The soft flexible flanges on the containers simply deflect around the strips 2 to form an adequate seal around the container for preventing spillage of non-fluid granular type food products or the like.

The measuring container 1 is then subjected to oscillation by the oscillating device 6, so that the materials heaped beyond the port of the measuring container 1 are caused to fall onto the hopper 4; the amount of the materials contained in the measuring container 1 being made uniform. Since part of the materials in the measuring container 1 can also be caused to fall if the measuring container 1 is inclined by a certain angle, the oscillating device 6 is capable of reducing the amount of the materials in the measuring container 1 to be smaller than its volume. The measuring container 1 containing a predetermined amount of materials reaches the exhaust station 23 and is turned by the hooking device consisting of rack 24 and pinion 25, and exhausts the materials so that they are supplied to the container 27.

Figure 2:
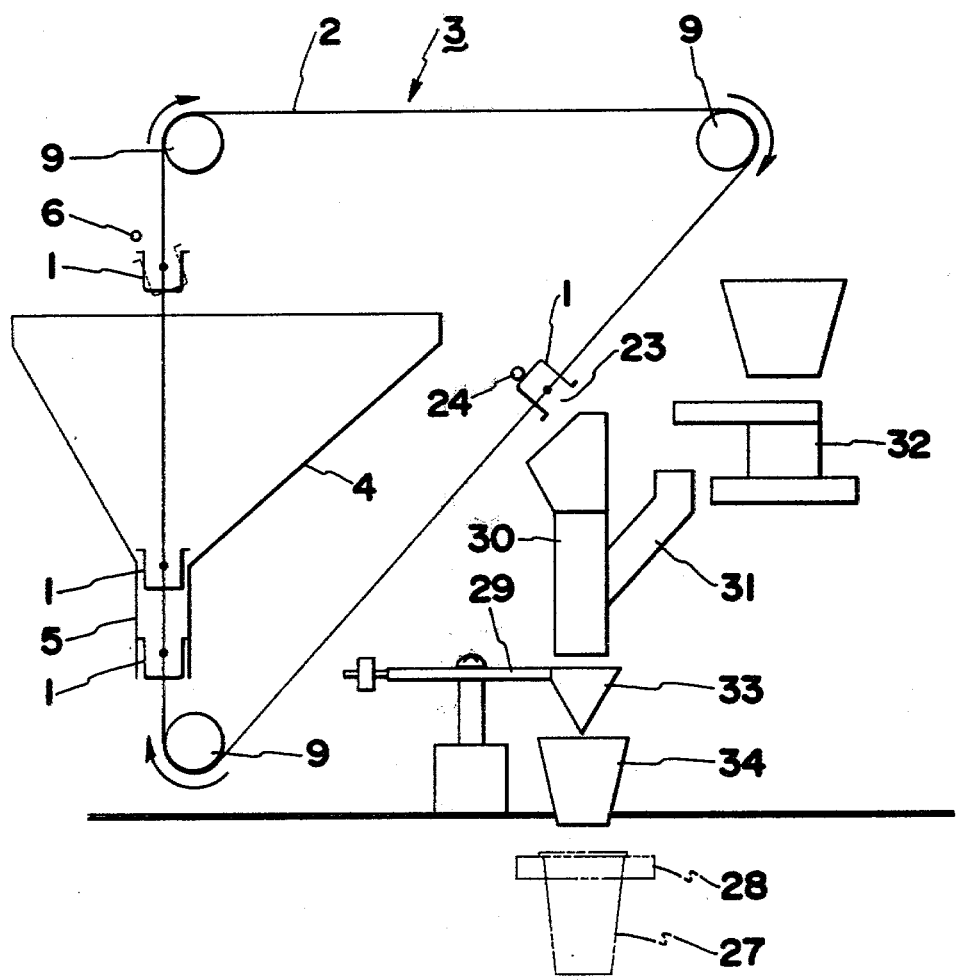
FIG. 2 is a schematic front view of another embodiment of the present invention.

Next, the invention is described below with reference to another embodiment shown in FIG. 2. The measuring containers 1, endless strips 2, endless conveyor 3, hopper 4, guide cylinder 5 and sprockets 9 are the same as those shown in FIG. 1, and their illustration is omitted here. In FIG. 2, the motor for driving the endless conveyor 3 is also omitted.

The oscillating device 6 of FIG. 2 consists of a fixed contacting rod for swinging and oscillating the measuring container 1 to a predetermined angle utilizing the structure that the measuring container 1 has been rotatably pivoted onto an endless strip 2. That is, a part lower than the pivot point of the measuring container 1 held by the endless conveyor 3 comes into contact with the contacting rod, so that the measuring container 1 is turned by a certain angle to establish a certain amount of the materials in the measuring container 1.

A rod member 24 that also serves as a hooking device is provided at an exhaust station 23 for exhausting the materials. The rod member 24 consists of a member similar to the contacting member forming the oscilating device 6. When said contacting member comes in contact with the lower part of the measuring container 1; the container 1 is turned to exhaust the materials. Any type of oscillating device 6 and hooking device may be employed in addition to those shown in FIG. 1 and FIG. 2, if they can perform the aforesaid function.

An inlet port of a chute 30 for guiding the materials to a weight measuring device 29 is placed beneath the exhaust station 23 shown in FIG. 2. A chute 31 is coupled to the chute 30, and a device 32 for feeding the materials in small amounts is positioned above the inlet port of the chute 31. A container 27 that will be transferred by a conveyor 28 is positioned below a material receiver 33 of the weight measuring device 29 via a chute 34.

The amount of the materials is determined by the volume of the measuring container 1. However, the volume and the weight may not often establish a proportional relation depending upon the kinds of the materials. It may further be often required that the materials in the container 27 must satisfy predetermined volume and weight. In the case of FIG. 2, therefore, the materials measured to a certain volume by the measuring container 1 are measured for their weight by the weight measuring device 29. When the weight requirement is satisfied, the materials are supplied to the container 27. When the weight is short of a determined value, the materials are supplemented in small amounts by the device 32 for supplying in small amounts via the chute 31 depending upon a command from the weight measuring device 29. When the weight has reached a satisfactory value, the device 32 for supplying in small amounts is stopped, depending upon the command from the weight measuring device 29, and the materials are supplied from the weight measuring device 29 onto the container 27. The command circuits of the weight measuring device 29 and the device 32 for supplying in small amounts are not illustrated here.

What is claimed is:

1. A conveyor device for supplying bulk foods in a measured manner characterized in that a plurality of measuring containers each having a flange on a peripheral surface thereof are pivotally supported on endless conveyor strips at predetermined distances between each other and in a manner such that said measuring containers have their open ends normally directed upwardly to thereby comprise an endless conveyor, a hopper, a guide cylinder extending from a lower part of said hopper, said conveyor passing upwardly through said guide cylinder from the bottom part of said hopper through an upper part thereof;

said containers being spaced such that, and said endless conveyor ascending in a manner such that at least one measuring container is always within said guide cylinder with its said flange maintaining sliding sealing contact with the inner surface of said guide cylinder;

an oscillating device disposed adjacent the track of said endless conveyor, said oscillating device being so constructed as to oscillate each said measuring container while it is still within the outer edge of said hopper after having scooped bulk material in order to cause excess quantities of said bulk material to fall into said hopper;

and means provided at an exhausting station for discharging the material on said endless conveyor comprising means for inverting said measuring containers.

2. A conveyor device according to claim 1, wherein: said flanges are made of a soft material and are positioned adjacent the inlet port of said measuring containers, so that said flanges maintain suitable sliding contact with said guide cylinder.

3. A conveyor device according to claim 1, wherein: said means for exhausting material comprises a rack positioned adjacent said conveyor and mating pinions attached to each said measuring container.

4. A conveyor device according to claim 1, wherein: said means for exhausting material comprises a fixed rod member which comes into engagement with said containers below their pivot points on said endless conveyor.

* * * * *